(12) United States Patent
Bae et al.

(10) Patent No.: US 11,401,027 B2
(45) Date of Patent: Aug. 2, 2022

(54) MORPHING WING

(71) Applicant: Industry-University Cooperation Foundation Korea Aerospace University, Gyeonggi-do (KR)

(72) Inventors: Jae Sung Bae, Seoul (KR); Hyun Chul Lee, Gyeongsangnam-do (KR); Soo Yong Lee, Gyeonggi-do (KR)

(73) Assignee: INDUSTRY-UNIVERSITY COOPERATION FOUNDATION KOREA AEROSPACE UNIVERSITY, Gyeonggi-Do (KR)

( * ) Notice: Subject to any disclaimer, the term of this patent is extended or adjusted under 35 U.S.C. 154(b) by 274 days.

(21) Appl. No.: 16/605,621

(22) PCT Filed: Sep. 17, 2018

(86) PCT No.: PCT/KR2018/010927
§ 371 (c)(1),
(2) Date: Oct. 16, 2019

(87) PCT Pub. No.: WO2020/059896
PCT Pub. Date: Mar. 26, 2020

(65) Prior Publication Data
US 2021/0331781 A1    Oct. 28, 2021

(51) Int. Cl.
B64C 3/48    (2006.01)
B64C 3/18    (2006.01)
B64C 3/26    (2006.01)

(52) U.S. Cl.
CPC ............. B64C 3/48 (2013.01); B64C 3/182 (2013.01); B64C 3/185 (2013.01); B64C 3/187 (2013.01); B64C 3/26 (2013.01)

(58) Field of Classification Search
CPC .. B64C 3/48; B64C 3/187; B64C 3/54; B64C 3/38; B64C 3/44; B64C 3/52; B64C 3/546; B64C 2003/543; B64C 2003/445
See application file for complete search history.

(56) References Cited

U.S. PATENT DOCUMENTS 1,301,196 A * 4/1919 Thompson ................ B64C 3/54
                                            244/218
1,742,910 A * 1/1930 Grinoch .................... B64C 3/54
                                            244/218
2013/0146717 A1   6/2013 Santini

* cited by examiner

*Primary Examiner* — Michael H Wang
*Assistant Examiner* — Colin Zohoori
(74) *Attorney, Agent, or Firm* — Tarolli, Sundheim, Covell & Tummino LLP

(57) ABSTRACT

Disclosed is a wing in which, while a continuous surface is maintained, a chord length and camber of an airfoil may be modified via only a rotational drive alone, whereby a structure is simple and aerodynamic efficiency may be improved.

24 Claims, 10 Drawing Sheets

[FIG. 1]
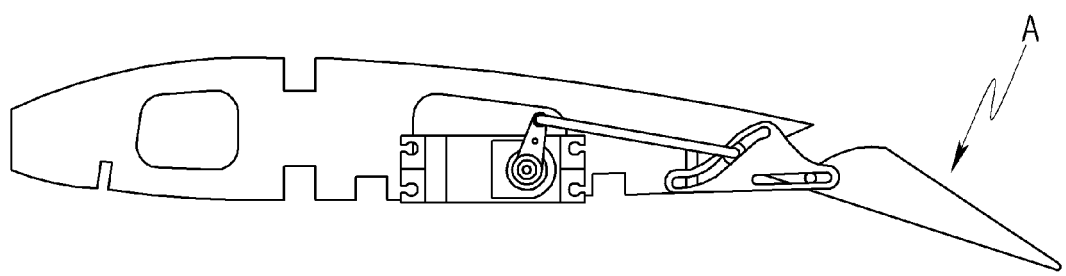

[FIG. 2]
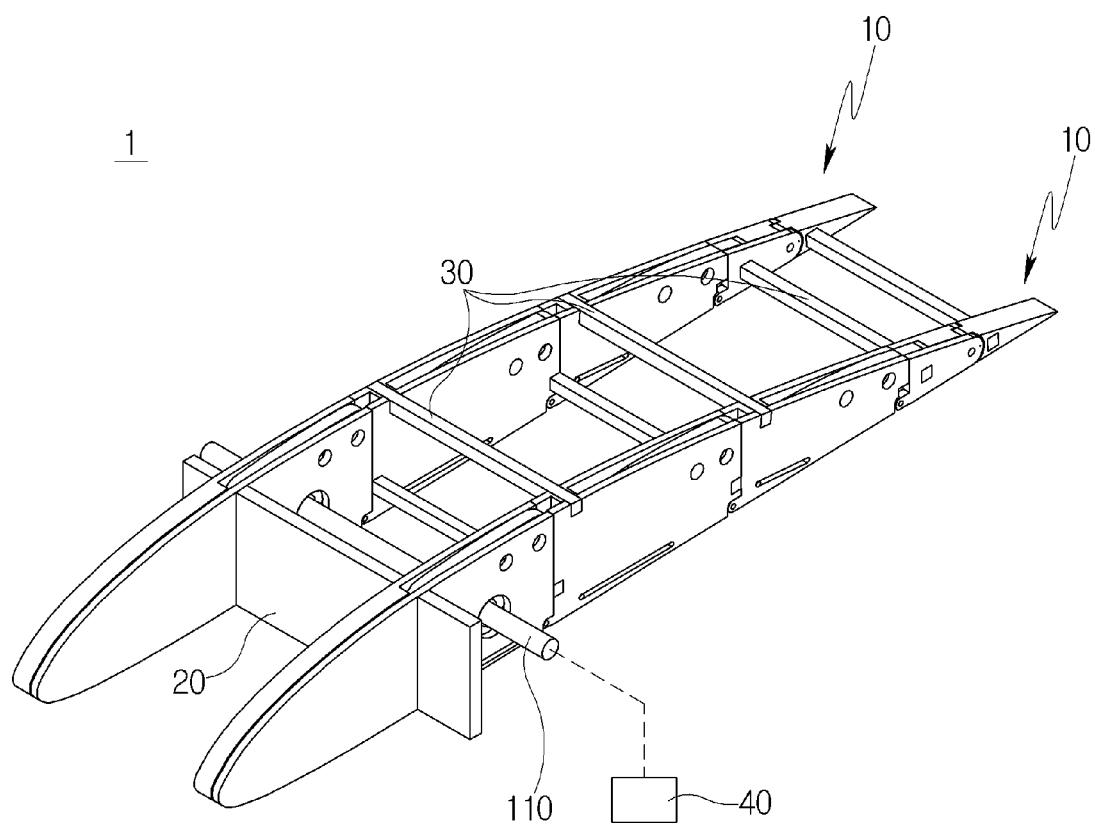

[FIG. 3]
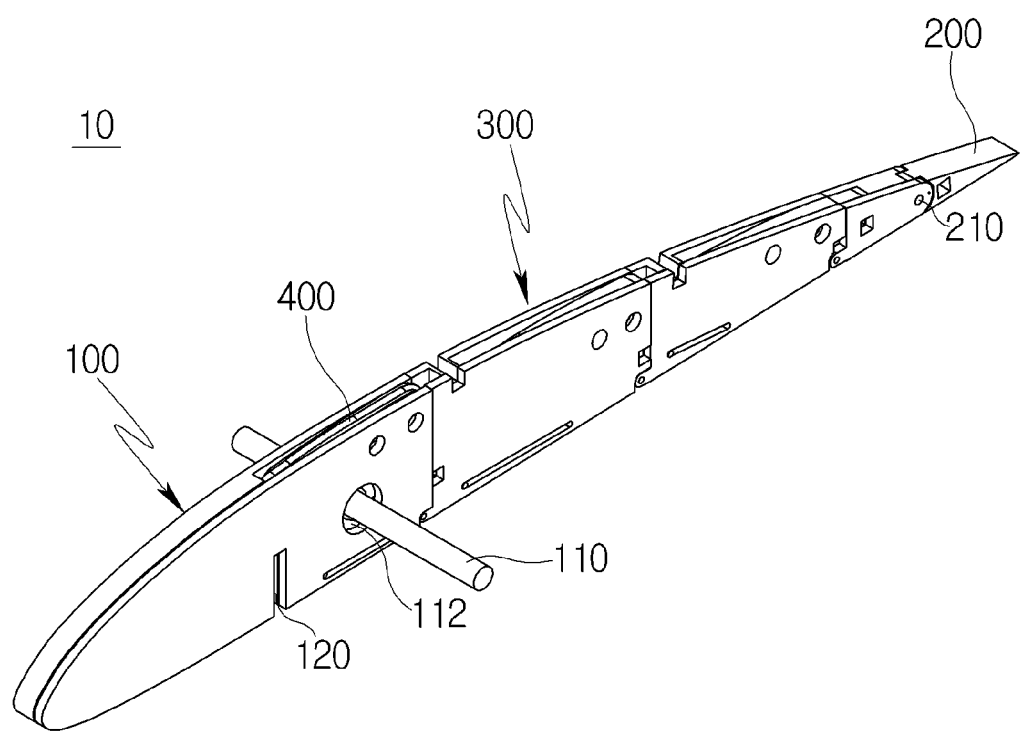

[FIG. 4]
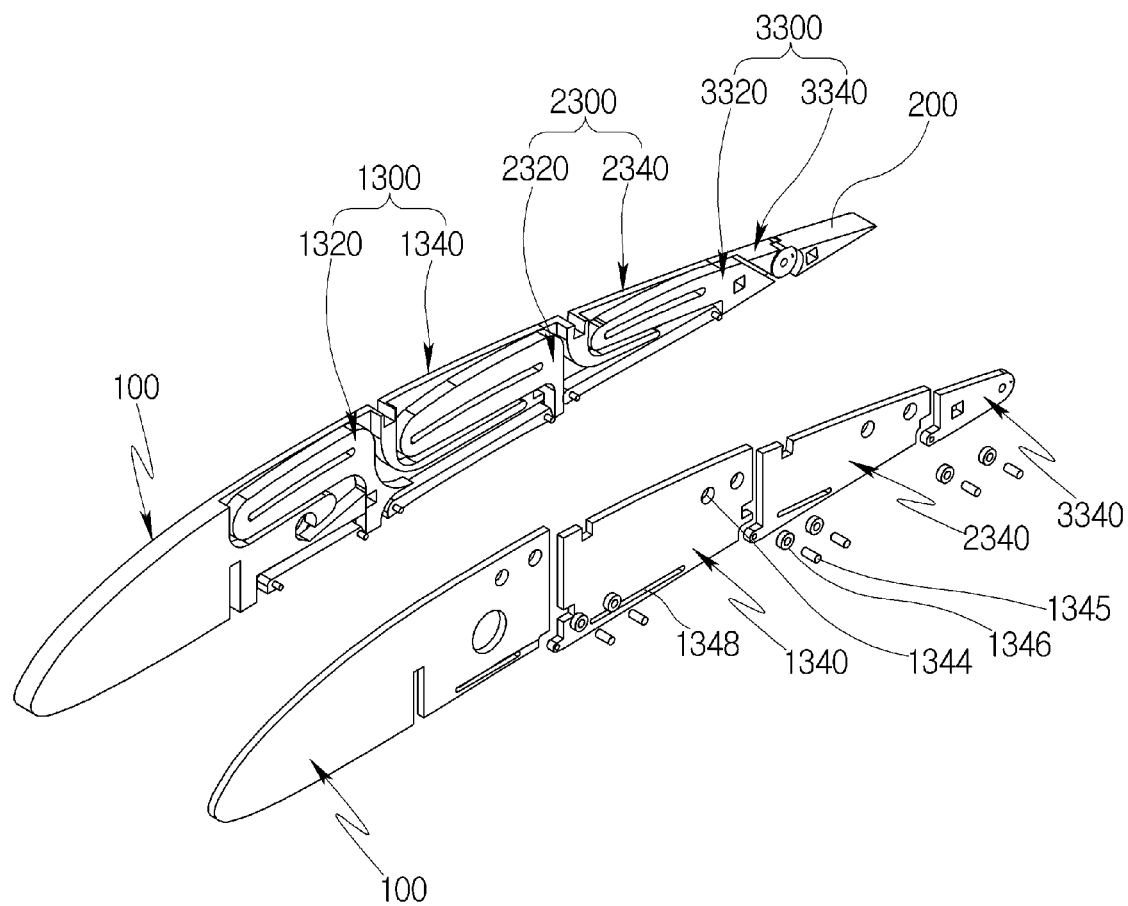

[FIG. 5]
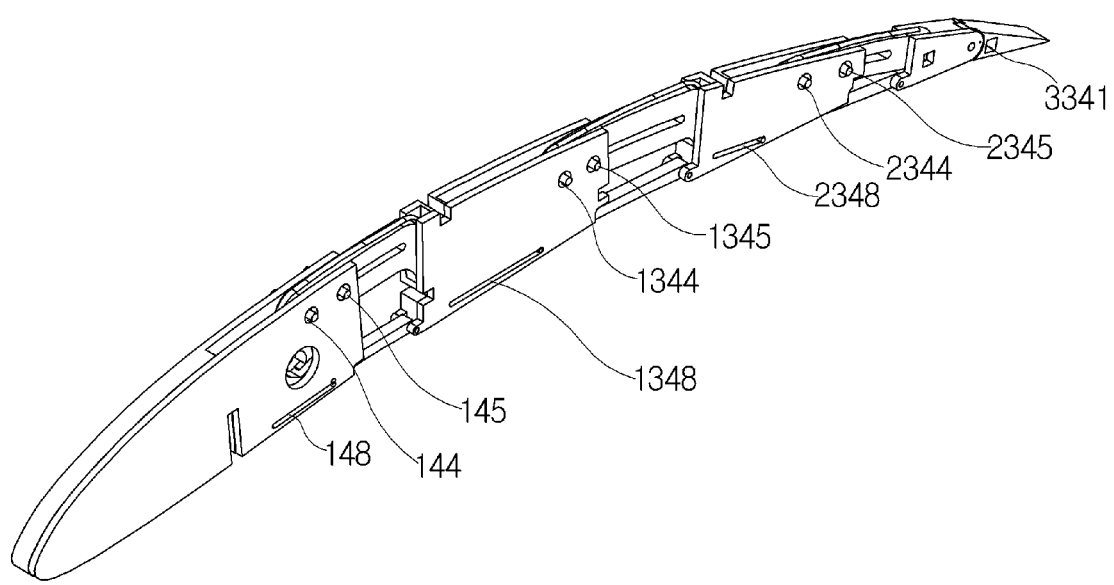

[FIG. 6]
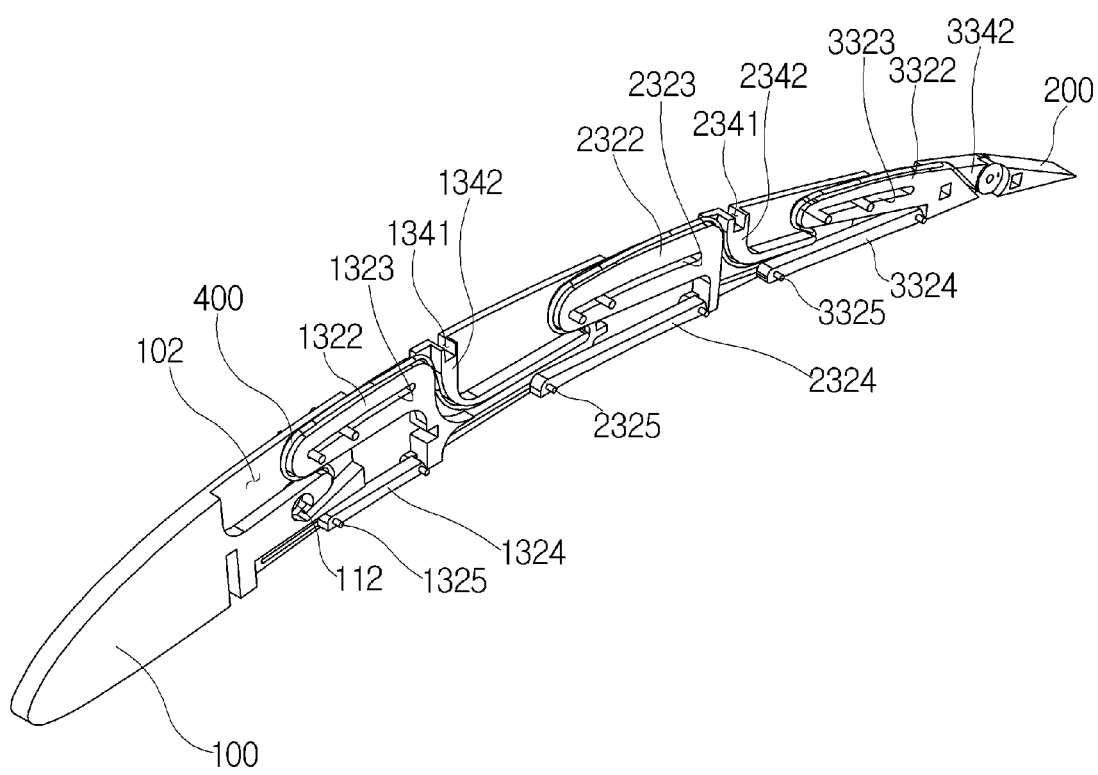

[FIG. 7]
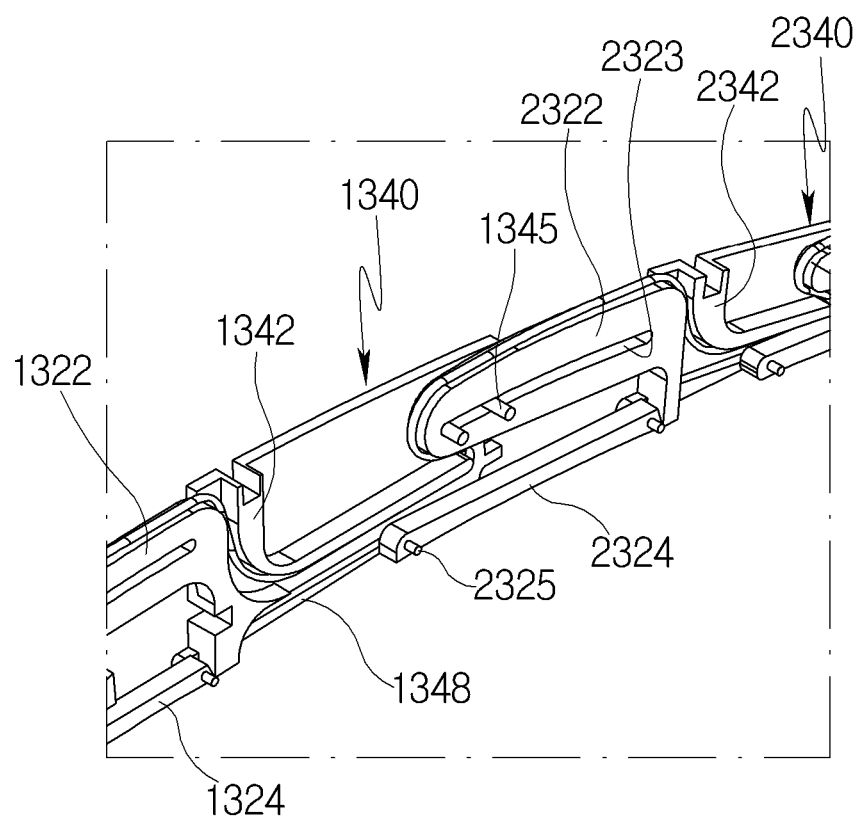

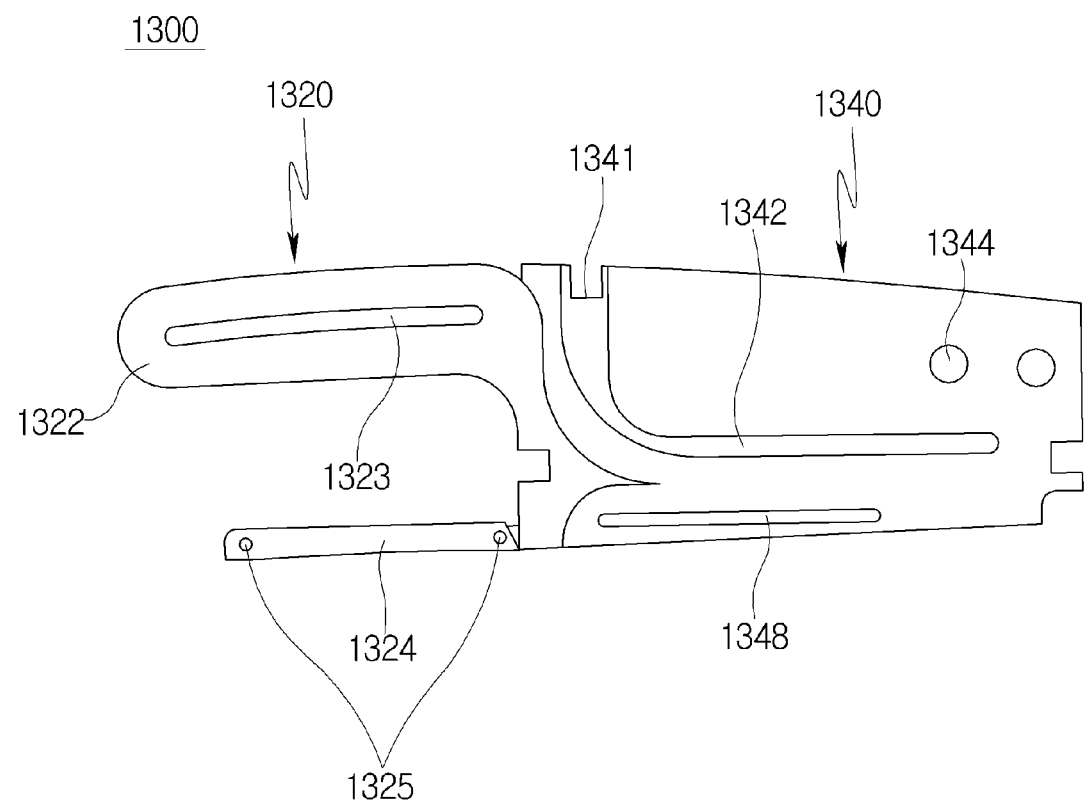
[FIG. 8]

[FIG. 9]
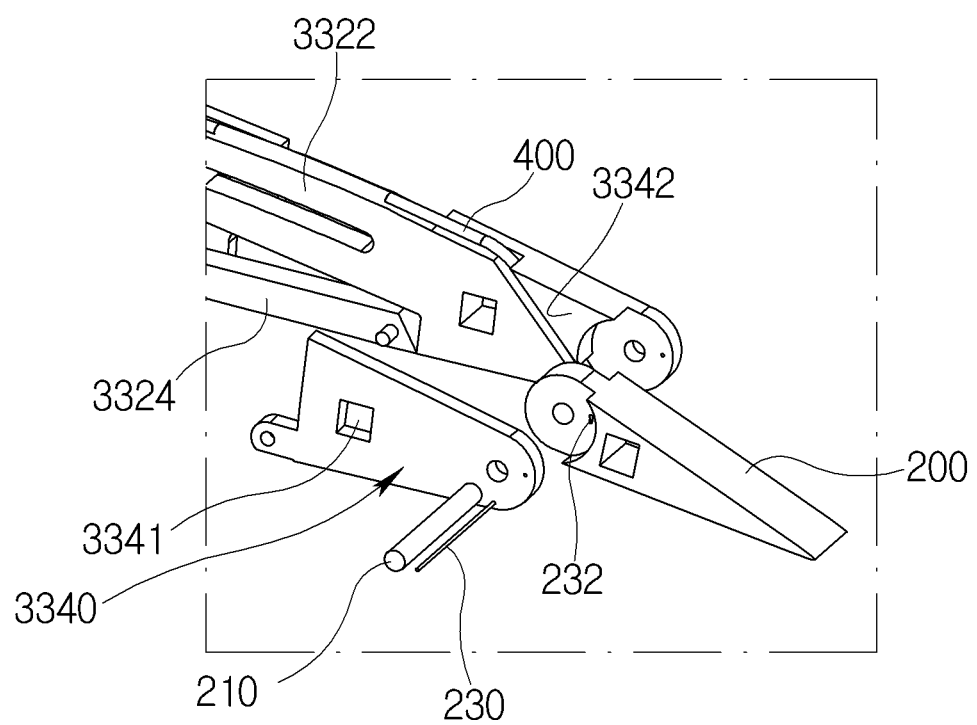

[FIG. 10]
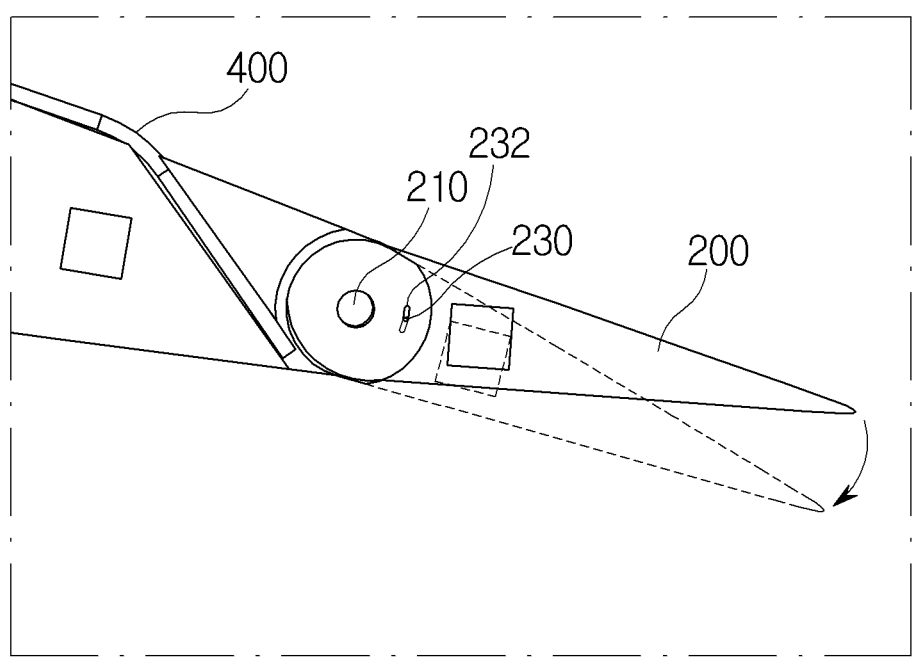

MORPHING WING

RELATED APPLICATIONS

The present invention is a U.S. National Stage under 35 USC 371 patent application, claiming priority to Serial No. PCT/KR2018/010927, filed on 17 Sep. 2018, the entirety of which is incorporated herein by reference.

TECHNICAL FIELD

The present invention relates to a morphing wing and, more particularly, to a wing in which, while a continuous surface is maintained, a chord length and camber of an airfoil may be modified via only a rotational drive alone, whereby the structure of the wing is simple and aerodynamic efficiency thereof is improved.

BACKGROUND ART

In general, a fixed wing aircraft is provided with a high lift device to generate a steering force to change a flight attitude and flight direction during flight and to increase the lift force during take-off and landing.

Here, the high lift device refers to a device that increases the lift force of an aircraft and enables the lift force replenishment or low-speed flight during takeoff and landing of a high-speed aircraft.

A cross-sectional shape of an aircraft wing directly affects performance of the aircraft and should be designed for optimum performance in aircraft design. In other words, there are two types of wing cross-sections: a low-speed type for high lift force in take-off and landing conditions and a high-speed type for low drag in cruising conditions. However, these two conditions cannot be satisfied at the same time, and the optimum shape is determined through appropriate compromise.

In particular, a trailing edge portion of the wing is exposed to outside in both of a cruising condition as well as a low-speed condition in which the high lift device is folded, thereby greatly affecting the performance of the aircraft.

Accordingly, research is being actively conducted recently to develop an aircraft having an optimal shape for flight conditions applying technology morphing a trailing edge portion of a wing.

In general, a device for generating the steering force and high lift force is located in a trailing edge portion of a wing to generate the steering force and to increase lift force during takeoff and landing. In addition, the above-mentioned device changes the aerodynamic force on the flap, which is mechanically separated from the wing, thereby generating the steering force and high lift force.

FIG. 1 is a view showing a configuration of a conventional morphing device for a trailing edge portion of a wing, and, as shown in FIG. 1, conventionally, morphing is implemented by separating the trailing edge portion A of the wing.

Thus, since the trailing edge portion A of the wing is separated, a step is generated at a connecting portion, thereby causing a discontinuous surface. Accordingly, drag is generated at the discontinuous surface, whereby a problem that the aerodynamic efficiency degrades occurs.

In addition, the number of required parts increases due to separation of the trailing edge portion from the wing structure, thereby increasing weight of the aircraft. At the same time, a magnitude of drag, which is a main cause of loss of propulsion of the aircraft during operation, becomes large.

As a result, above-described features act as a major cause of fuel loss during operation of the aircraft and may also cause an increase in repair costs.

DISCLOSURE

Technical Problem

Accordingly, the present invention has been made keeping in mind the above problems occurring in the related art, and an objective of the present invention is to provide a morphing wing in which, while a continuous surface is maintained, a chord length and camber of an airfoil can be modified via only a rotational drive alone, whereby the structure of the wing is simple and aerodynamic efficiency thereof can be improved.

Technical Solution

In order to accomplish the above objective, the present invention provides a wing, made of a plurality of ribs connected to each other, wherein each of the ribs may include: a leading edge portion; a trailing edge portion; a plurality of intermediate slide portions slidably coupled and disposed between the leading edge portion and the trailing edge portion; and a wire connected from the leading edge portion to the trailing edge portion via each of the intermediate slide portions, and by winding or unwinding one end of the wire, a slide movement of each of the intermediate slide portions is made, wherein each of the intermediate slide portions forms a curvature and provides a continuous surface from the leading edge portion up to the trailing edge portion.

According to an embodiment of the present invention, a drive shaft hole may be provided in the leading edge portion, and a drive shaft may be rotatably coupled to the drive shaft hole, the trailing edge portion may be rotatably coupled to the intermediate slide portion adjacent thereto, and each end of the wire may be connected to each of the drive shaft and the coupling shaft.

According to the embodiment of the present invention, each of the ribs may further include an angle adjusting unit for limiting a rotation angle range of the trailing edge portion.

According to the embodiment of the present invention, the angle adjusting unit may include: an angle adjusting slot provided in the trailing edge portion or the intermediate slide portion adjacent to the trailing edge portion over a rotation angle range of the trailing edge portion; and an angle adjusting pin inserted into the angle adjusting slot.

According to the embodiment of the present invention, each of the intermediate slide portions may include: a slide arm part for being slidably coupled to the leading edge portion or other intermediate slide portion adjacent to each of the intermediate slide portions; and cover parts, composed of a pair, facing and coupled to each other at opposite sides of the slide arm part.

According to the embodiment of the present invention, in a space between the cover parts, composed of a pair, the slide arm part of the other intermediate slide portion adjacent to each of the intermediate slide portions, or the trailing edge portion may be disposed.

According to the embodiment of the present invention, the slide arm part may include: a first arm part forming an upper surface of an airfoil when sliding and is wound along a circumference thereof by the wire; and a second arm part facing the first arm part and forming a lower surface of the airfoil when sliding.

According to the embodiment of the present invention, the cover parts composed of a pair includes a wire guide part providing a path for the wire to be guided and altering a running direction of the wire.

According to the embodiment of the present invention, the wire may be connected from the drive shaft to the coupling shaft along the first arm part of each of the intermediate slide portions and along the wire guide parts, wherein a running direction of the wire may be altered when the wire is connected to the first arm part from the drive shaft or the wire guide part, and when the wire passing through by wrapping the first arm part is connected to the wire guide part.

According to the embodiment of the present invention, when one end of the wire is pulled by rotating the drive shaft connected thereto, the slide arm part of each of the intermediate slide portions may be slid from the leading edge portion or from the cover part of the other intermediate slide portion adjacent to each of the intermediate slide portions, the trailing edge portion begins to rotate from the intermediate slide portion adjacent thereto, and each of the intermediate slide portions and the trailing edge portion, from the leading edge portion, form a continuous curvature and are curved.

According to the embodiment of the present invention, in order for the slide arm part and the leading edge portion or the cover part of the intermediate slide portion facing the slide arm part to be coupled to each other so as to be slidably movable, a coupling hole, which is formed long along the slide direction, may be provided on one side, and a moving part, which is installed to be movable within the coupling hole, may be provided on the other side.

According to the embodiment of the present invention, the first arm part may include internally a first coupling hole formed long along the slide direction.

According to the embodiment of the present invention, the leading edge portion and the cover parts, each of which is composed of a pair, may include: at least one second coupling hole formed at positions facing the positions of the first coupling holes; and a coupling pin installed by being inserted into the first coupling holes and the second coupling holes at the same time and are movable along the longitudinal direction of the first coupling holes.

According to the embodiment of the present invention, the second arm part may include a plurality of coupling protrusions provided on opposite ends.

According to the embodiment of the present invention, the leading edge portion and the cover parts, each of which is composed of a pair, may further include a third coupling hole provided long along the slide direction at the position facing the second arm part, wherein the coupling protrusion provided on one end of the second arm part is coupled into the third coupling hole.

According to the embodiment of the present invention, the cover parts, each of which is composed of a pair, may be coupled to a coupling protrusion provided on an opposite end of the second arm part.

According to the embodiment of the present invention, each of the ribs may further include bearings installed between the second coupling holes and the coupling pins.

According to the embodiment of the present invention, the plurality of intermediate slide portions may include a first to a third intermediate slide portions disposed between the leading edge portion and the trailing edge portion.

According to the embodiment of the present invention, the leading edge portion may further include a spar slot coupled with a spar for connecting a plurality of the leading edge portions in the plurality of ribs arranged side by side.

According to the embodiment of the present invention, the cover part may further include stringer grooves coupled with stringers for connecting the plurality of the cover parts in the plurality of ribs arranged side by side.

According to the embodiment of the present invention, the stringer groove may be provided on a side above the wire guide part.

According to the embodiment of the present invention, the wing may further include a drive unit for driving the rotation of the drive shaft.

According to the embodiment of the present invention, the wing may further include a wing skin for wrapping the plurality of ribs, wherein the wing skin is made of an elastic material.

According to the embodiment of the present invention, the wing may further include an elastic member, of the respective rib, connecting from the leading edge portion to the trailing edge portion via the plurality of intermediate slide portions.

Advantageous Effects

According to the morphing wing of the present invention, maneuvering morphing can be established by only one rotational drive, thereby simplifying the drive unit and reducing the overall weight.

In addition, because the shape of the continuous airfoil can be maintained even after the maneuvering morphing of the wing, the drag that is generated from the discontinuous surface does not occur, whereby the aerodynamic efficiency can be improved.

In addition, as the length of the entire chord of the airfoil as well as the angle of the trailing edge portion 200 is increased, the wing surface is increased, whereby the lift force can be greatly increased.

The effects of the present invention are not limited to the above-described effects, but should be understood to include all the effects deduced from the configuration of the invention described in the detailed description or claims of the present invention.

DESCRIPTION OF DRAWINGS

FIG. 1 is a view showing a configuration of a conventional morphing device for a trailing edge portion of a wing.

FIG. 2 is a perspective view illustrating a wing according to an embodiment of the present invention.

FIG. 3 is a perspective view illustrating one rib separated from FIG. 2.

FIG. 4 shows exploded perspective views illustrating exploded portions of a part of FIG. 3.

FIG. 5 is a perspective view illustrating a shape the rib of FIG. 3 is morphed.

FIG. 6 is a sectional view of FIG. 5.

FIG. 7 is an enlarged perspective view of a part of FIG. 6.

FIG. 8 is a front view illustrating an intermediate slide portion separated from the rib of FIG. 4.

FIG. 9 is an enlarged perspective view illustrating a part (a rear part) of FIG. 4.

FIG. 10 is a front view for illustrating an operating status of FIG. 9.

MODE FOR INVENTION

Hereinafter, exemplary embodiments of a morphing wing of the present invention will be described with reference to FIGS. 2 to 10.

In addition, terms to be described later are terms defined in consideration of functions in the present invention, which may vary according to intentions or practices of users or operators. In addition, the following embodiments do not limit the scope of the present invention and are merely illustrative of the components set forth in the claims.

In order to clearly describe the present invention, parts irrelevant to the description are omitted, and like reference numerals designate like elements throughout the specification. Throughout the specification, when a part is said to "include" a certain component, it means that it may further include other components, without excluding the other components unless explicitly stated otherwise.

FIG. 2 is a perspective view illustrating a wing according to an embodiment of the present invention, FIG. 3 is a perspective view illustrating one rib separated from FIG. 2, FIG. 4 shows exploded perspective views illustrating exploded portions of a part of FIG. 3, FIG. 5 is a perspective view illustrating a shape the rib of FIG. 3 is morphed, FIG. 6 is a sectional view of FIG. 5, FIG. 7 is an enlarged perspective view of a part of FIG. 6, FIG. 8 is a front view illustrating an intermediate slide portion separated from the rib of FIG. 4, FIG. 9 is an enlarged perspective view illustrating a part (a rear part) of FIG. 4, and FIG. 10 is a front view for illustrating an operating status of FIG. 9.

The wing of the present invention is made by connecting a plurality of ribs to each other, wherein the ribs are components forming a skeleton of the wing and are wing structure members in a chord direction to form a sectional shape of an airfoil.

The morphing wing of the present invention may be applied to various fields, and may be applied to blades of wind turbines as well as aircraft wings.

The wing 1 according to an embodiment of the present invention is made by connecting two ribs 10, which are arranged side by side as shown in FIG. 2.

However, the present invention is not limited hereto. Naturally, the wing may be made by connecting at least three ribs.

The plurality of ribs 10 may be coupled to one drive shaft 110 side by side, and may be connected to each other using a separate spar 20 and stringers 30 as connecting members. This will be described in detail below.

In this case, with reference to FIG. 3, each rib 10 will be described in detail. The respective rib 10 may include a leading edge portion 100, a trailing edge portion 200, a plurality of intermediate slide portions 300, and a wire 400.

The leading edge portion 100 is a portion forming a front portion of the airfoil of the wing, and a drive shaft hole 112 is provided in the leading edge portion 100, and a drive shaft 110 is to be rotatably coupled to the drive shaft hole 112.

The drive shaft 110 is an axle to which the plurality of ribs 10 is connected and coupled. As will be described later, the drive shaft 110 is rotatable by a separate drive unit 40 and may control maneuvering morphing of the wing by winding or unwinding the wire 400 connected thereto.

Spar slots 120, to which a spar 20 is coupled to connect a plurality of the leading edge portions 100, may be provided in the leading edge portions 100, respectively, in the plurality of ribs 10 arranged side by side. Accordingly, as shown in FIG. 2, the spar 20 may serve to connect and support the plurality of the leading edge portions 100 in the plurality of the ribs 10 arranged side by side and may mainly take charge of bending and twisting loads by supporting the load of the wing. In this case, the spar 20 may be formed to have the same height as the leading edge portions 100.

The trailing edge portion 200 is a portion forming a rear portion of the airfoil of the wing and is rotatably coupled to the intermediate slide portion 300 adjacent thereto by a coupling shaft 210. The structure thereof will be described in detail below.

The plurality of intermediate slide portions 300 is arranged to be slidably coupled between the leading edge portion 100 and the trailing edge portion 200 and allows the maneuvering morphing of the wing to be possible by sliding from the leading edge portion 100.

Although not limited hereto, in the present exemplary embodiment, the plurality of the intermediate slide portions 300 includes first to third intermediate slide portions 1300, 2300, and 3300 disposed between the leading edge portion 100 and the trailing edge portion and will be described with reference hereto.

With reference to FIGS. 4 to 8, the intermediate slide portions 1300, 2300, and 3300 may include slide arm parts 1320, 2320, and 3320, respectively, wherein each of the slide arm parts may be slidably coupled to the leading edge portion 100 or to other intermediate slide portion adjacent to each of the intermediate slide portions. In addition, each of the cover parts is composed of a pair, which faces and is coupled to each other at opposite sides of the slide arm part, which the corresponding intermediate slide portion includes.

The cover parts 1340, 2340, and 3340, each of which is composed of a pair, may be coupled to rear end sides of the slide arm parts 1320, 2320, and 3320, respectively. Then, the cover parts 1340, 2340, and 3340 each face and coupled to each other at opposite sides of the slide arm part 1320, 2320, and 3320, respectively, whereby, for each of the cover parts 1340, 2340, and 3340, a predetermined space may be provided between the cover parts composed of a pair.

In this case, in the space between the each of the cover parts 1340, 2340, and 3340, each of which is composed of a pair, the slide arm part 2320 or 3320 of the other intermediate slide portion adjacent to each of the intermediate slide portions, or the trailing edge portion 200 may be disposed.

Specifically, in the leading edge portion 100, a space portion 102 is provided to allow the slide arm part 1320 of the first intermediate slide portion 1300 adjacent to the leading edge portion 100 to be coupled to be slidable, in a space between the cover parts 1340 of the first intermediate slide portion 1300, the slide arm part 2320 of the second intermediate slide portion 2300 adjacent to the first intermediate slide portion 1300 is disposed and slidably coupled thereto, in a space between the cover parts 2340 of the second intermediate slide portion 2300, the slide arm part 3320 of the third intermediate slide portion 3300 adjacent to the second intermediate slide portion 2300 is disposed and slidably coupled thereto, in a space between the cover parts 3340 of the third intermediate slide portion 3300, the trailing edge portion is disposed and slidably coupled thereto.

That is, the leading edge portion 100, the first to third intermediate slide portions 1300, 2300, and 3300, and the trailing edge portion 200 are structured such that each frontend thereof is engaged onto and coupled with each corresponding rear end thereof.

Next, when looked in detail with respect to the structure of each of the intermediate slide portions 1300, 2300, and 3300, each of the slide arm parts 1320, 2320, and 3320 may include first arm parts 1322, 2322, and 3322 that form an upper surface of the airfoil when sliding and is wound along a circumference thereof by the wire 400; and second arm parts 1324, 2324, and 3324 that face the first arm parts, respectively, and form a lower surface of the airfoil when sliding.

Specifically, as shown in FIG. 8, when described in detail with reference to the first intermediate slide portion 1300, the first arm part 1322 and the second arm part 1324 may be provided to stretch out to a front end and to extend along a longitudinal direction of the airfoil in order to slidably couple into the space portion 102 of the leading edge portion 100 which is disposed at the front end of the first intermediate slide portion 1300.

Accordingly, when the wing is morphed as shown in FIG. 7, the first arm part 1322 and the second arm part 1324 are slid from the leading edge portion 100 to form an upper surface and a lower surface of the airfoil, respectively, and serve to extend the length. In this case, the first arm part 1322 and the second arm part 1324 may be provided with the various lengths according to the position, angle, and the like of the disposition thereof. Accordingly, the first arm part 1322 may be provided to be longer or the second arm part 1324 may be provided to be longer.

In addition, the each of the cover parts 1340, 2340, and 3340, each of which is composed of a pair, may correspondingly include respective wire guide parts 1342, 2342, and 3342 which provide a path for the wire 400 to be guided and alter a running direction of the wire 400.

Specifically, in the present one embodiment, the wire guide parts 1342 and 2342 of the first intermediate slide portion 1300 and the second intermediate slide portion 2300, respectively, are provided to stretch out toward the rear end of the corresponding cover parts in order to send the wire 400 coming out from the respective slide arm parts 1320 and 2320 to the rear end side of each of the cover parts 1340 and 2340.

The wire guides 1342 and 2342 may be provided to protrude to the inner side of the respective cover parts 1340 and 2340 and may be disposed between the slide arm parts of adjacent intermediate slide portions, wherein each of the slide arm parts is disposed in a space provided in each of the cover parts 1340 and 2340, each of which is composed of a pair. In the present embodiment, the wire guides 1342 and 2342 are provided on sides below the first arm parts 2232 and 3322 of the second intermediate slide portion and the third intermediate slide portion, respectively, which are adjacent to the cover portions 1340 and 2340.

Accordingly, as will be described later, the wire 400 is not connected in a straight line when passing from the slide arm part of the front end to the slide arm part of the rear end. That is, after being guided from the slide arm part of the front end to an end of the cover parts, the wire 400 alters the running direction thereof and then may pass to the next slide arm part of the rear end.

In the present exemplary embodiment, the cover part 3340 of the third intermediate slide portion 3300 includes a wire guide part 3342 in the same manner, but the wire guide part 3342 is provided in a structure different from the wire guide parts 1342 and 2342 of the first and second intermediate slide portion.

The wire guide part 3342 of the third intermediate slide portion is provided to guide the wire 400 passing from the slide arm part 3320 of the third intermediate slide portion to the coupling shaft 210.

In addition, each of the cover parts 1340, 2340, and 3340 may further include stringer grooves 1341, 2341, and 3341 to which the stringers 30 for connecting the plurality of cover parts are coupled in the plurality of ribs 10 arranged side by side.

As shown in FIG. 2, the stringers 30 may be installed in stringer grooves provided side by side in the plurality of the ribs 10 and may take charge of shape maintenance as well as a part of strength.

In this case, the stringer groove may be provided on a side above the wire guide part.

Specifically, in the present embodiment, the stringer grooves 1341 and 2341 formed in the cover parts 1340 and 2340 of the first intermediate slide portion and second intermediate slide portion, respectively, are provided on the side above each of the wire guide parts 1342 and 2342.

In addition, the stringer groove 3341 provided in the cover parts 3340 of the third intermediate slide portion is provided at an inner portion of the cover parts 3340.

However, the present invention is not limited hereto, and the stringer grooves are portions in which stringers are disposed to connect the ribs to each other when at least two ribs 10 are disposed. Here, the stringer grooves may be provided in any locations as long as the locations are not influenced when a wire or a component is driven.

Next, described is a structure which allows the slide arm part and the leading edge portion or the cover parts of the intermediate slide portion facing the slide arm part to be coupled to each other.

Specifically, in the present embodiment, the slide arm part 1320 of the first intermediate slide portion 1300, the slide arm part 2320 of the second intermediate slide portion 2300, and slide arm part 3320 of the third intermediate slide portion 3300 are each coupled to be slidable with the leading edge portion 100, the cover parts 1340 of the first intermediate slide portion 1300, and the cover parts 2340 of the second intermediate slide portion 2300, respectively.

To this end, a respective coupling hole, which is formed long along the slide direction, may be provided on one side of one slide arm part and the leading edge portion facing the one slide arm part and the other slide arm parts and cover parts facing the other slide arm parts. In addition, a respective moving part, which is installed to be movable within the coupling hole, may be provided on another side of one slide arm part and the leading edge portion facing the one slide arm part and the other slide arm parts and cover parts facing the other slide arm parts.

Specifically, in the present exemplary embodiment, the first arm parts 1322, 2322, and 3322 include first coupling holes 1323, 2323, and 3323, respectively, that are formed internally and extending along the slide direction.

In addition, the leading edge portion 100 or cover parts 1340 and 2340, each of which is composed of a pair, which are facing the first arm parts 1322, 2322, and 3322, respectively, may include: second coupling holes 144, 1344, and 2344, which are each composed of at least one hole and are formed at positions facing the positions of the first coupling holes 1323, 2323, and 3323; and coupling pins 145, 1345, and 2345 which are installed by being inserted at the same time into the first coupling holes 1323, 2323, and 3323 and the second coupling holes 144, 1344, and 2344 and are movable along the longitudinal direction of the first coupling holes.

The second coupling holes 144, 1344, and 2344 may be provided in a circular shape to allow the coupling pins 145, 1345, and 2345 inserted thereinto only to rotate, but not to move. In addition, bearings 1346 may be installed between the second coupling holes 144, 1344 and 2344 and the coupling pins 145, 1345 and 2345 so that the coupling pins 145, 1345, and 2345 may rotate without friction in the second coupling holes 144, 1344 and 2344.

In addition, the second coupling holes 144, 1344, and 2344 are provided at positions facing the first coupling holes 1323, 2323, and 3323 and may be provided at rear end sides of the first coupling holes 1323, 2323, and 3323.

Accordingly, because the coupling pins 145, 1345, and 2345, fixedly installed to the leading edge portion 100 or the respective cover parts 1340 and 2340, are movable along the longitudinal direction of the first coupling holes 1323, 2323, and 3323, formed in the slide arm parts 1320, 2320, and 3320 coupled to the leading edge portion 100 or the respective cover parts 1340 and 2340, the slide arm parts 1320, 2320, and 3320 may slidably move from each of the leading edge portion 100 and the respective cover parts 1340 and 2340.

However, the present invention is not limited hereto, and coupling protrusions may be formed as moving parts on the respective first arm parts, and coupling holes facing the coupling protrusions and extending along the slide direction may be provided in the leading edge portion or respective cover parts. In this case, because the trailing edge portion 200 is rotatably coupled in the cover part 3340 of the third intermediate slide portion, the second coupling hole may not be provided.

Next, the second arm parts 1324, 2324, and 3324 may include a plurality of coupling protrusions 1325, 2325, and 3325 provided at opposite ends.

In addition, the leading edge portion 100 or the cover parts 1340 and 2340, each of which is composed of a pair, facing the second arm parts 1324, 2324 and 3324 may further include third coupling holes 148, 1348, and 2348 provided along the slide direction at the position facing the second arm parts 1324, 2324 and 3324, and the coupling protrusions 1325, 2325, and 3325 provided on one end of the second arm parts may be coupled to the third coupling holes 148, 1348, and 2348.

In addition, cover parts 1340, 2340, and 3340, each of which is composed of a pair, may be coupled to the coupling protrusions 1325, 2325, and 3325 provided on an opposite end of the second arm parts.

Specifically, in the present embodiment, on opposite ends of the second arm parts 1324, 2324, and 3324, protrusions 1325, 2325, and 3325 protruding to opposite sides are provided toward the leading edge portion 100 or the cover parts 1340 and 2340, each of which is composed of a pair, facing the opposite ends of the second arm parts. The coupling protrusion located on the front end of the opposite ends is coupled to third coupling holes 148, 1348 and 2348, which are provided in the leading edge portion 100 or each of the cover parts 1340 and 2340 and are facing the front end of the opposite ends, so as to be movable along the longitudinal direction of the third coupling holes. Meanwhile, the coupling protrusion located on the rear end of the opposite ends is used when each of the cover parts 1340, 2340, and 3340 of the intermediate slide portions is coupled.

Accordingly, because one side of each of the second arm parts 1324, 2324, and 3324 is connected to the corresponding one of the cover parts 1340, 2340, and 3340, and the opposite side thereof is movable in the longitudinal direction of each of the third coupling holes 148, 1348, and 2348, the slide arm parts 1320, 2320, and 3320 may be slidably moved from the leading edge portion 100 or the corresponding one of the cover parts 1340 and 2340.

In this case, as the second arm parts 1324, 2324, and 3324 are slidable along the length direction of the third coupling holes 148, 1348, and 2348, respectively, and have rotational degrees of freedom, each angle thereof may be changed, and the degree of change of the angle may be formed differently for a position of each of the intermediate sliding portions.

However, the present invention is not limited hereto. As in the coupling structure of the first arm parts 1322, 2322, and 3322 described above and the leading edge portion 100 or each of the cover parts 1340 and 2340, each of which is composed of a pair, which are facing the first arm parts, coupling holes provided long along the slide direction may be provided in each of the second arm parts, and a coupling pin or a coupling protrusion may be provided as a moving part in the leading edge portion or each cover part, which are facing the second arm parts. In this case, because the trailing edge portion 200 is rotatably coupled in the cover part 3340 of the third intermediate slide portion, a third coupling hole may not be provided.

The wire 400 may be connected from the leading edge portion 100 to the trailing edge portion 200 via each of the intermediate slide portions 300.

Accordingly, one end of the wire 400 is wound or unwound so that the slide movement of each of the intermediate slide portions 300 is performed, wherein each of the intermediate slide portions 300 may form a curvature and provide a continuous surface from the leading edge portion 100 up to the trailing edge portion 200.

Specifically, each end of the wire 400 is connected to the drive shaft 110 and the coupling shaft 210. More specifically, the wire 400 is connected from the drive shaft 110 to the coupling shaft 210 along the first arm parts 1322, 2322, and 3322 of each of the intermediate slide portions and the wire guide part 1342, 2342, and 3342.

In this case, the wire 400 may be directly connected to the drive shaft 110 and the coupling shaft 210, but, naturally, may be indirectly connected to the drive shaft 110 and the coupling shaft 210 by being connected to a separate component (member) connected to the drive shaft 110 and the coupling shaft 210.

A running direction of the wire 400 is altered when the wire 400 is connected to each of the first arm parts 1322, 2322, and 3322 from the drive shaft 110 or each of the wire guide parts 1342 and 2342 and when the wire 400 passing through by wrapping each of the first arm parts 1322, 2322, and 3322, is connected to each of the wire guide parts.

Accordingly, when the drive shaft 110 is rotated to pull the wire 400 connected thereto, the wire 400 is pulled, so that the respective slide arm part, that is, each of the first arm parts 1322, 2322, and 3322 is pushed out, whereby the intermediate slide portions may slide.

To this end, the wing of the present invention may further include a drive unit 40 for driving the rotation of the drive shaft 110.

The drive unit 40 may rotate the drive shaft 110 by being connected thereto and providing power thereto.

Accordingly, when looking at the operational structure of the wing according to an embodiment of the present invention with reference to FIGS. 5 and 6, when one end of the wire 400 is pulled by rotating the drive shaft 110 connected thereto, each of the slide arm parts 1320, 2320, and 3320 of the intermediate slide portions is slid from the leading edge portion 100 or from the cover parts 1340 and 2340 of the other intermediate slide portions adjacent to each of the intermediate slide portions to which the slide arm parts 2320 and 3320 are slid, respectively, and the trailing edge portion 200 rotates due to the intermediate slide portion 3300 adjacent thereto.

As a result, each of the intermediate slide portions 1300, 2300, and 3300 and the trailing edge portion 200 may be curved while forming a continuous curvature from the leading edge portion 100.

As described above, according to the morphing wing of the present invention, maneuvering morphing may be established by only one rotational drive, thereby simplifying the drive unit and reducing the overall weight.

In addition, because the shape of the continuous airfoil may be maintained even after the maneuvering morphing of the wing, the drag that is generated from the discontinuous surface does not occur, whereby the aerodynamic efficiency may be improved.

In addition, as the length of the entire chord of the airfoil as well as the angle of the trailing edge portion 200 is increased, the wing surface is increased, whereby the lift force may be greatly increased.

In this case, with reference to FIGS. 9 and 10, each of the ribs 10 may further include an angle adjusting unit for limiting the rotation angle range of the trailing edge portion 200.

The angle adjusting unit may include an angle adjusting slot provided in the trailing edge portion 200 or the intermediate slide portion adjacent to the trailing edge portion 200 over a rotation angle range of the trailing edge portion 200 and an angle adjusting pin inserted into the angle adjusting slot.

Specifically, in the present embodiment, the trailing edge portion 200 is disposed between the cover parts 3340 of the third intermediate slide portion and is rotatably coupled by the coupling shaft 210. In addition, the trailing edge portion 200 is provided with the angle adjusting slot 232 formed along the circumferential direction of the coupling shaft 210 over a rotation angle range thereof.

The angle adjusting pin 230, fixed to the cover parts 3340 of the third intermediate slide portion, is inserted into the angle adjusting slot 232. In this case, because the angle adjusting pin is movable along the longitudinal direction of the slot within the angle adjusting slot 232, the trailing edge portion 200 may be rotated within the range of the angle adjusting slot 232.

Accordingly, it is possible to maintain the shape of the continuous airfoil when the maneuvering morphing of the wing is performed.

In addition, it is necessary to restore the original shape after the maneuvering morphing of the wing is performed as described above.

That is, when one end of the wire 400 connected to the drive shaft 110 is unwound again by rotating the drive shaft 110, a pulling force is needed to allow each of the intermediate slide portions 1300, 2300, and 3300 and the trailing edge portion 200 to be slid toward a side of the leading edge portion 100.

To this end, the wing 1 of the present invention may further include a wing skin (not shown), which may be made of an elastic material, for wrapping the plurality of the ribs 10.

Accordingly, when one end of the wound wire 400 is unwound again by rotating the drive shaft 110 after the maneuvering morphing of the wing 1 is performed, each of the intermediate slide portions 1300, 2300, and 3300 and the trailing edge portion 200 is pulled and slid to the side of the leading edge portion 100, thereby being allowed to be restored to original shape thereof.

However, the present invention is not limited hereto, and according to another exemplary embodiment, the wings 1 of the present invention may further include an elastic member (not shown), for each rib 10, connecting from the leading edge portion 100 to the trailing edge portion 200 via the plurality of intermediate slide portions 300.

At this time, a plurality of the elastic members may individually connect the leading edge portion 100 and the first intermediate slide portion 1300 adjacent thereto, the first intermediate slide portion 1300 and the second intermediate slide portion 2300, the second intermediate slide portion 2300 and the third intermediate slide portion 3300 to each other. However, one elastic member may be coupled to the spar 20 and springers 30 connecting each of the ribs 10 to each other, whereby connection thereof may be done at one time.

The present invention is not limited to the above-described specific embodiments and descriptions, and various modifications may be made by those skilled in the art without departing from the gist of the present invention claimed in the claims. Such variations are within the protection scope of the present invention.

INDUSTRIAL APPLICABILITY

The present invention relates to a morphing wing and, more particularly, to a wing in which, while a continuous surface is maintained, a chord length and camber of an airfoil may be modified via only a rotational drive alone, whereby a structure is simple and aerodynamic efficiency may be improved.

The invention claimed is:

1. A wing, made of a plurality of ribs connected to each other, wherein each of the ribs includes:
   a leading edge portion;
   a trailing edge portion;
   a plurality of intermediate slide portions slidably coupled and disposed between the leading edge portion and the trailing edge portion; and
   a wire connected from the leading edge portion to the trailing edge portion via each of the intermediate slide portions, and
   by winding or unwinding one end of the wire, a slide movement of each of the intermediate slide portions is made, wherein each of the intermediate slide portions forms a curvature and provides a continuous surface from the leading edge portion up to the trailing edge portion.

2. The wing of claim 1, wherein
   a drive shaft hole is provided in the leading edge portion, and a drive shaft is rotatably coupled to the drive shaft hole,
   the trailing edge portion is rotatably coupled to the intermediate slide portion adjacent thereto, and
   each end of the wire is connected to each of the drive shaft and a coupling shaft.

3. The wing of claim 2, wherein each of the ribs further includes an angle adjusting unit for limiting a rotation angle range of the trailing edge portion.

4. The wing of claim 3, wherein the angle adjusting unit includes:
   an angle adjusting slot provided in the trailing edge portion or the intermediate slide portion adjacent to the trailing edge portion over a rotation angle range of the trailing edge portion; and
   an angle adjusting pin inserted into the angle adjusting slot.

5. The wing of claim 2, wherein each of the intermediate slide portions includes:

a slide arm part for being slidably coupled to the leading edge portion or other intermediate slide portion adjacent to each of the intermediate slide portions; and a pair of cover parts facing and coupled to each other at opposite sides of the slide arm part.

6. The wing of claim 5, wherein, in a space between the pair of cover parts, the slide arm part of the other intermediate slide portion adjacent to each of the intermediate slide portions, or the trailing edge portion is disposed.

7. The wing of claim 6, wherein the slide arm part includes:

a first arm part forming an upper surface of an airfoil when sliding and is wound along a circumference thereof by the wire; and a second arm part facing the first arm part and forming a lower surface of the airfoil when sliding.

8. The wing of claim 7, wherein the pair of cover parts include a wire guide part providing a path for the wire to be guided and altering a running direction of the wire.

9. The wing of claim 8, wherein the wire is connected from the drive shaft to the coupling shaft along the first arm part of each of the intermediate slide portions and along the wire guide parts, wherein a running direction of the wire is altered when the wire is connected to the first arm part from the drive shaft or the wire guide part, and when the wire passing through by wrapping the first arm part is connected to the wire guide part.

10. The wing of claim 9, wherein, when one end of the wire is pulled by rotating the drive shaft connected thereto, the slide arm part of each of the intermediate slide portions is slid from the leading edge portion or from the cover part of the other intermediate slide portion adjacent to each of the intermediate slide portions, the trailing edge portion begins to rotate from the intermediate slide portion adjacent thereto, and each of the intermediate slide portions and the trailing edge portion, from the leading edge portion, form a continuous curvature and are curved.

11. The wing of claim 8, wherein, in order for the slide arm part and the leading edge portion or the cover part of the intermediate slide portion facing the slide arm part to be coupled to each other so as to be slidably movable, a coupling hole, which is formed long along the slide direction, is provided on one side, and a moving part, which is installed to be movable within the coupling hole, is provided on the other side.

12. The wing of claim 11, wherein the first arm part includes internally a first coupling hole formed long along the slide direction.

13. The wing of claim 12, wherein the leading edge portion and the pair of cover parts include:

at least one second coupling hole formed at positions facing the positions of the first coupling holes; and a coupling pin installed by being inserted into the first coupling holes and the second coupling holes at the same time and are movable along the longitudinal direction of the first coupling holes.

14. The wing of claim 13, wherein the second arm part includes a plurality of coupling protrusions provided on opposite ends.

15. The wing of claim 14, wherein the leading edge portion and the pair of cover parts further include a third coupling hole provided long along the slide direction at the position facing the second arm part, wherein the coupling protrusion provided on one end of the second arm part is coupled into the third coupling hole.

16. The wing of claim 15, wherein the pair of cover parts is coupled to a coupling protrusion provided on an opposite end of the second arm part.

17. The wing of claim 13, wherein each of the ribs further includes bearings installed between the second coupling holes and the coupling pins.

18. The wing of claim 8, wherein the cover part further includes stringer grooves coupled with stringers for connecting the pair of cover parts in the plurality of ribs arranged side by side.

19. The wing of claim 18, wherein the stringer groove is provided on a side above the wire guide part.

20. The wing of claim 2, further comprising:
a drive unit for driving the rotation of the drive shaft.

21. The wing of claim 1, wherein the plurality of intermediate slide portions includes a first to a third intermediate slide portions disposed between the leading edge portion and the trailing edge portion.

22. The wing of claim 1, wherein the leading edge portion further includes a spar slot coupled with a spar for connecting a plurality of the leading edge portions in the plurality of ribs arranged side by side.

23. The wing of claim 1, further comprising:
a wing skin for wrapping the plurality of ribs, wherein the wing skin is made of an elastic material.

24. The wing of claim 1, further comprising:
an elastic member, of the respective rib, connecting from the leading edge portion to the trailing edge portion via the plurality of intermediate slide portions.

* * * * *